US009626263B2

United States Patent
Senf

(10) Patent No.: US 9,626,263 B2
(45) Date of Patent: Apr. 18, 2017

(54) TESTING A CONTROL UNIT BY MEANS OF A TEST ENVIRONMENT

(71) Applicant: dSPACE digital signal processing and control engineering GmbH, Paderborn (DE)

(72) Inventor: Matthias Senf, Paderborn (DE)

(73) Assignee: dSPACE digital signal processing and control engineering GmbH, Paderborn (DE)

(*) Notice: Subject to any disclaimer, the term of this patent is extended or adjusted under 35 U.S.C. 154(b) by 144 days.

(21) Appl. No.: 14/525,764

(22) Filed: Oct. 28, 2014

(65) Prior Publication Data
US 2015/0121140 A1 Apr. 30, 2015

(30) Foreign Application Priority Data

Oct. 28, 2013 (EP) .................................... 13190448

(51) Int. Cl.
*G06F 11/00* (2006.01)
*G06F 11/26* (2006.01)
(Continued)

(52) U.S. Cl.
CPC .......... *G06F 11/26* (2013.01); *G05B 23/0256* (2013.01); *G06F 11/3668* (2013.01);
(Continued)

(58) Field of Classification Search
CPC .... G06F 11/26; G06F 11/3668; G06F 11/263; G06F 11/3648; G06F 11/366;
(Continued)

(56) References Cited

U.S. PATENT DOCUMENTS

| 2007/0050105 A1* | 3/2007 | Chinnadurai ........... H04L 67/12 701/31.4 |
| 2008/0154532 A1 | 6/2008 | Huillet |
| 2010/0174522 A1 | 7/2010 | Stuenkel et al. |
| 2010/0250220 A1 | 9/2010 | Colmenares |
| 2012/0101791 A1* | 4/2012 | Komatsu ................ G05B 17/02 703/6 |

(Continued)

FOREIGN PATENT DOCUMENTS

| DE | 100 65 508 A1 | 7/2002 |
| DE | 10 2004 006 089 A1 | 5/2005 |

(Continued)

OTHER PUBLICATIONS

Japanese Office Action for Japanese Application No. 2014-218870 dated Jan. 10, 2017 with English translation.

*Primary Examiner* — Joseph D Manoskey
(74) *Attorney, Agent, or Firm* — Muncy, Geissler, Olds & Lowe, P.C.

(57) ABSTRACT

An arrangement for testing a control unit via a test environment, having a computer-based test management tool, wherein the test management tool is configured for model-based development and/or management of at least one test plan implemented as a data structure in order to test the control unit, and the test plan has at least one test and a start condition for initiating execution of the test plan; a computer-based test execution control tool, wherein the test execution control tool is configured to initiate execution of the test plan on the test environment when the start condition is met; and a computer-based database, wherein the database is configured to store the test plan implemented as a data structure and is also configured for shared, common access to the test plan by the test management tool and the test execution control tool.

19 Claims, 2 Drawing Sheets

(51) Int. Cl.
*G06F 11/36* (2006.01)
*G05B 23/02* (2006.01)

(52) U.S. Cl.
CPC ...... *G06F 11/3672* (2013.01); *G06F 11/3688* (2013.01); *G05B 2219/23027* (2013.01); *G05B 2219/25057* (2013.01); *G05B 2219/2604* (2013.01); *G05B 2219/2637* (2013.01); *G05B 2219/32342* (2013.01); *Y02P 90/26* (2015.11)

(58) Field of Classification Search
CPC ............ G06F 11/3688; G05B 23/0256; G05B 2219/23027; G05B 2219/25057; G05B 2219/2604; G05B 2219/2367; G05B 2219/32342; Y02P 90/26
USPC ............................ 714/25, 27, 30, 32, 33, 37
See application file for complete search history.

(56) References Cited

U.S. PATENT DOCUMENTS

2014/0019942 A1* 1/2014 Suevern .............. G06F 11/3664
717/124

FOREIGN PATENT DOCUMENTS

| | | |
|---|---|---|
| DE | 10 2007 029137 A1 | 1/2009 |
| JP | H 10-69402 A | 3/1998 |
| JP | 2008-084121 A | 4/2008 |
| JP | 2010-224972 A | 10/2010 |
| JP | 2011-252805 A | 12/2011 |
| WO | WO 2006/081869 A1 | 8/2006 |

* cited by examiner

TESTING A CONTROL UNIT BY MEANS OF A TEST ENVIRONMENT

This nonprovisional application claims priority under 35 U.S.C. §119(a) to European Patent Application No. 13190448.4, which was filed in Europe on Oct. 28, 2013, and which is herein incorporated by reference.

BACKGROUND OF THE INVENTION

Field of the Invention

The invention relates to an arrangement for testing a control unit via a test environment, having a computer-based test management tool, wherein the test management tool is configured for model-based development and/or management of at least one test plan implemented as a data structure, and the test plan has at least one test. The invention additionally relates to a method for testing a control unit via a test environment, including the step of developing a model-based test plan implemented as a data structure for testing the control unit on a computer-based test management tool, wherein the test plan has at least one test.

Description of the Background Art

During the development and testing of control units, such as for motor vehicles, great quantities of data are produced, since a great number of test results are produced, in addition to the test plans themselves, when test plans are implemented in a test environment. Moreover, the growing complexity and the demands on the functions of control units have the consequence that the person responsible for the test must continually create, administer, and subsequently carry out new test cases tailored to the complexity and the requirements.

Test execution itself is increasingly becoming a bottleneck, since the demands for complexity naturally have effects on the test environment, and the great number of tests make the execution very resource-intensive overall. At present, it is no longer possible in practice to execute all test cases with every environment constellation, since the time available within a development cycle for the control unit must be used to maximum effectiveness. Also problematic are the physical size and weight of the test environments, such as in the case of hardware-in-the-loop environments, in particular, and also the noise generated during execution of the tests.

The great number of tests to be performed has also led to the result that analysis of the tests is carried out, and in this process the causes of any errors are sought, and new tests are developed on this basis, during the work hours of the person responsible for the tests. Execution of the tests then generally takes place outside of this person's work hours, for instance overnight as so-called "lights-out" testing.

However, it is problematic in this situation that, due to the automatic execution of the tests on the one hand, and the absence of the responsible person on the other hand, errors in the assembly of the tests or in the setup or configuration of the test environment can have the effect that invalid tests, which is to say tests that cannot be performed, are supposed to be executed. This has the result that complete execution of the tests, and hence also of subsequent tests, is blocked or a test sequence within a test plan is completely terminated. It is especially problematic here that oftentimes information from execution of the test is lost, making troubleshooting all the more difficult.

SUMMARY OF THE INVENTION

It is therefore an object of the invention to provide an arrangement and a method allowing control units to be tested significantly more efficiently. More specifically, an object is to optimize performance of the tests such that a test plan does not terminate in the middle of execution even in the case of tests that are invalid and cannot be performed, and on the other hand it is ensured that the relevant information from the execution of a test is not lost when an error occurs during the execution, so that a responsible person receives sufficient feedback to be able to identify the error that has resulted in the termination.

Accordingly, the object is attained in an embodiment by an arrangement for testing a control unit via a test environment, comprising a computer-based test management tool, wherein the test management tool is configured for model-based development and/or management of at least one test plan implemented as a data structure for testing the control unit, and the test plan has at least one test and a start condition for initiating execution of the test plan, a computer-based test execution control tool, wherein the test execution control tool is configured to initiate execution of the test plan on the test environment when the start condition is met, and a computer-based database, wherein the database is configured to store the test plan implemented as a data structure and is also configured for shared, common access to the test plan by the test management tool and the test execution control tool. In an emboidmenty, the test execution control tool and the test management tool can be located on separate and independent computers that are spatially distant from one another.

The invention thus takes an entirely new approach, namely in that the creation and administration of test plans are separated from the execution of the test plan, so that parallelization is even possible. The reason for this is that the spatial separation of the test management tool, such as, e.g., the tester's workstation, from the actual test environment, such as, e.g., a hardware-in-the-loop environment, makes it possible for test plans to be developed by the tester on the one hand, while on the other hand a test plan, such as, e.g., a test plan that has already been designed in full, can be executed in parallel thereto on the test environment.

But the fact that the test management tool and the test execution control tool both access a shared database, which permits so-called shared, simultaneous live access to the test plans stored in the database, ensures that the test plans remain consistent. In other words, the environment for the automatic test execution, in the present case called the test execution control tool, is not integrated in the management tool, in the present case called the test management tool, even though it does make use of the same set of data stored in the database. Consistent data from the test management tool are thus available to the test execution control tool, also referred to as the Test Executor within the framework of the invention, without any need for the data, such as the test plans, to be exported or processed separately.

The test execution control tool can be configured such that execution of the test plan need not be started manually. According to an embodiment of the invention, provision is made for the test plan to contain a start condition, the computer-based test execution control tool to check continuously whether the start condition is met, and if the start condition is met, to automatically execute the test plan in the test environment. As a result, the tester, such as, e.g., a user, test manager, and/or person responsible for the test, can create the test plans very conveniently and during his "normal work hours," while execution of the test plan takes place automatically at a spatially distant location. In this context, "separate and independent computers that are spatially distant from one another" should be understood within the scope of the invention to mean that the computers used for the test management tool and for the test execution control tool are entirely independent from one another but are connected to one another, for example through a computer network, for shared access to the database. The test execution control tool does not itself undertake execution of the test plan, but instead can cause a separate test execution tool to execute the test plan. In the case of a design of this nature, only the test execution tool stands in direct communication with the test environment, while the test execution control tool does not. The test execution tool can be implemented in the form of the commercially available product dSPACE AutomationDesk, for example, and can be part of the test environment.

It is also advantageous that, because of the temporal and spatial separation between creation and planning of the test plans on the one hand and execution of the test plans on the other hand, there is no need for the tester to be personally present during execution of the test plan, since execution is started automatically by the test execution control tool after the start condition has occurred. Furthermore, the test management tool is not blocked by the test execution control tool during execution of the test plan, so another test plan can be developed at or about the same time. Due to the fact that the test management tool and the test execution control tool both access the same test plan stored in the database, the test execution control tool is guaranteed to always actually follow changes in the test plan, even when belated changes are made to the test plan shortly before execution of the test plan.

The test plan can have at least one test for testing the control unit, such as a control unit for a motor vehicle, for example. The test can be designed to test a function of the control unit. As a basic principle, the database can be designed as any desired database known from the conventional art, thus for example as a relational database, and can be described by means of a database language SQL.

The test management tool can be configured such that the test plans for the control unit can not only be developed, but also administered and/or assigned attributes. For example, provision can be made that certain test plans can only be used for a certain control unit, for instance on the basis of an attribute. The execution for the individual test plans can be configured via the start condition to such an extent that, for example, it is possible to define the time at which the concrete test plan is to be executed by the test environment.

In an embodiment, the test execution control tool and the test management tool can be located on computers that are separated from one another by at least 5 m, 10 m, 20 m, 50 m or 100 m distance, for example, in separate rooms of a building or in different buildings. In this design, provision can additionally be made that the test execution control tool and/or the test management tool can be implemented as software on the computers located at a distance from one another in this way and, for example, each has a graphical user interface and corresponding input options via a keyboard and/or mouse.

As a basic principle, the start condition can be designed in any desired way. According to an embodiment, the start condition can include a time of day, a priority, an availability of the test environment, and/or a completion of a different test plan. Provision can thus be made, for instance, that another test plan is not started until after completion or performance of a different, previous test plan as a start condition. In like manner, provision can be made for execution of a test plan to take place at night by a time of day as a start condition, and, for example, for another test plan to subsequently be executed on the test environment. In like manner, the start condition can be a combination of the aforementioned features or other features so that, for example, execution of a test plan on the test environment does not take place until after a certain time of day and after completion of a different, previous test plan.

In another embodiment of the invention, provision is made for the test execution control tool to be designed to play test data acquired by the test environment from the control unit tested using the test plan back to the database. It is ensured in an embodiment of this nature that test data are transmitted to the database substantially continuously and immediately after acquisition, so that even in the event of an unforeseen termination of the test plan, the test data acquired during the at least partial execution of the test plan can be evaluated by the test management tool in order to be able to determine the cause of the unplanned termination. The playback of the test data can take place during execution of the test plan so that the acquired test data can, for example, also be analyzed, and if applicable visualized, by the test management tool in real time.

According to another embodiment, provision is made for the arrangement to have a plurality of test execution control tools, wherein each of the test execution control tools is configured to initiate execution of a particular test plan on a test environment associated with the particular test execution control tool. As a result of the fact that the different test execution control tools each have shared, simultaneous access to the database, each of the test execution control tools thus also knows which test plans are being executed on which other test execution control tools. In this respect, the possibility also arises to operate multiple test execution control tools simultaneously on different test environments so that, for example, load distribution can be implemented in which the particular test execution control tool always extracts only the next test plan of a predefined, ordered sequence of test plans from the database, executes the particular test plan, and informs the other, remaining test execution control tools of this by means of playback of the test data into the database. Alternatively or in addition, the particular test execution control tool can inform the other test execution control tools upon starting test execution.

According to an embodiment, the arrangement likewise comprises the test environment, wherein the test environment can be configured to initiate execution of the test plan and the test execution control tool spatially associated with the test environment is located on the test environment. Accordingly, the test management tool can be arranged spatially distant from the test execution control tool and the test environment, which are located in spatial proximity to one another. The test management tool can be implemented as the commercially available product dSPACE SYNECT, namely as data management and collaboration software for model-based development of test plans for control units.

The test environment can be implemented in any desired manner, wherein, however, it is especially preferred for the test environment to be implemented as a model-in-the-loop, software-in-the-loop, processor-in-the-loop and/or hardware-in-the-loop environment. Such environments are preferred for testing the functions, system integration, and communication of control units, wherein the control units to be tested can be used in, for example, motor vehicles, aircraft, robots, and so forth. The technical environment of the control units and system parts that are connected to one another can be simulated by a hardware-in-the-loop simulation, wherein the basic goal of such simulations is to find errors in control units in order to improve the software quality of the control unit in an early development stage. Investigations have shown that 90% of control unit errors can be found by hardware-in-the-loop simulations, with the result that time-to-market of the control unit is shortened considerably, and product recalls and the associated damage to corporate image are eliminated. In this regard, the invention represents a significant improvement over the prior art, since control units now can be tested far more efficiently and reliably using fewer resources.

In another embodiment, provision is made that the test plan comprises a variant configuration and the test management tool is designed for consistency testing of the variants with respect to the test plan and/or the test execution control tool is designed for configuration of the test environment in accordance with the variant configuration prior to execution of the test plan. According to this embodiment, therefore, the test environment itself can be configured in accordance with the variants required for the execution of the test plan prior to execution of the test plan on the test environment, thus, for example, it is possible to set whether the control unit is supposed to be used for a gasoline engine or for a diesel engine. It is equally possible to check whether the variants are at all consistent, which is to say can be used with respect to the concrete test plan, and/or whether the test plan can be executed at all on the test environment with regard to the required variants.

The object of the invention is additionally attained by a method for testing a control unit with a test environment, including the steps: (a) developing a test plan, implemented as a data structure, for testing the control unit on a computer-based test management tool as part of model-based development of control units, wherein the test plan has at least one test and a start condition for initiating execution of the test plan; (b) storing the test plan in a computer-based database that is configured for shared, common access to the test plan by the test management tool; and (c) when the start condition is met, initiating execution of the test plan on the test environment by a test execution control tool.

The basic idea of this method, just as in the above-described arrangement, is that the automatic execution of the test plan takes place at a spatially distant location from the development of the test plan as in step a), but wherein, as in step b), the test management tool and the test execution control tool access the same database in order to store or modify the test plan. This means, therefore, that even during execution of the test plan, the data structures stored in the database are kept consistent so that both the test management tool and the test execution control tool have shared and simultaneous access to the data structures that are kept consistent and up-to-date in this manner, for which purpose the method preferably is enhanced by means of step d) playback to the database of test data acquired by the test environment from the control unit tested using the test plan.

In a further development, the test plan includes a variant configuration, wherein the method comprises the additional steps: (a') testing the consistency of the variants with respect to the test plan by the test management tool, and/or (c') configuring the test environment in accordance with the variant configuration prior to execution of the test plan by the test execution control tool.

In this regard, in accordance with this embodiment the test environment can be appropriately configured prior to execution of the test plan, for example by flashing appropriate software, so that the configuration of the test environment can be flexibly adjusted with regard to variants, such as the type of engine to be controlled with the control unit. The test execution control tool thus has direct access to the test plans stored in the database on the one hand, and to the test environment on the other hand, so it becomes possible to adjust the test environment with respect to the specific test plan to be tested.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
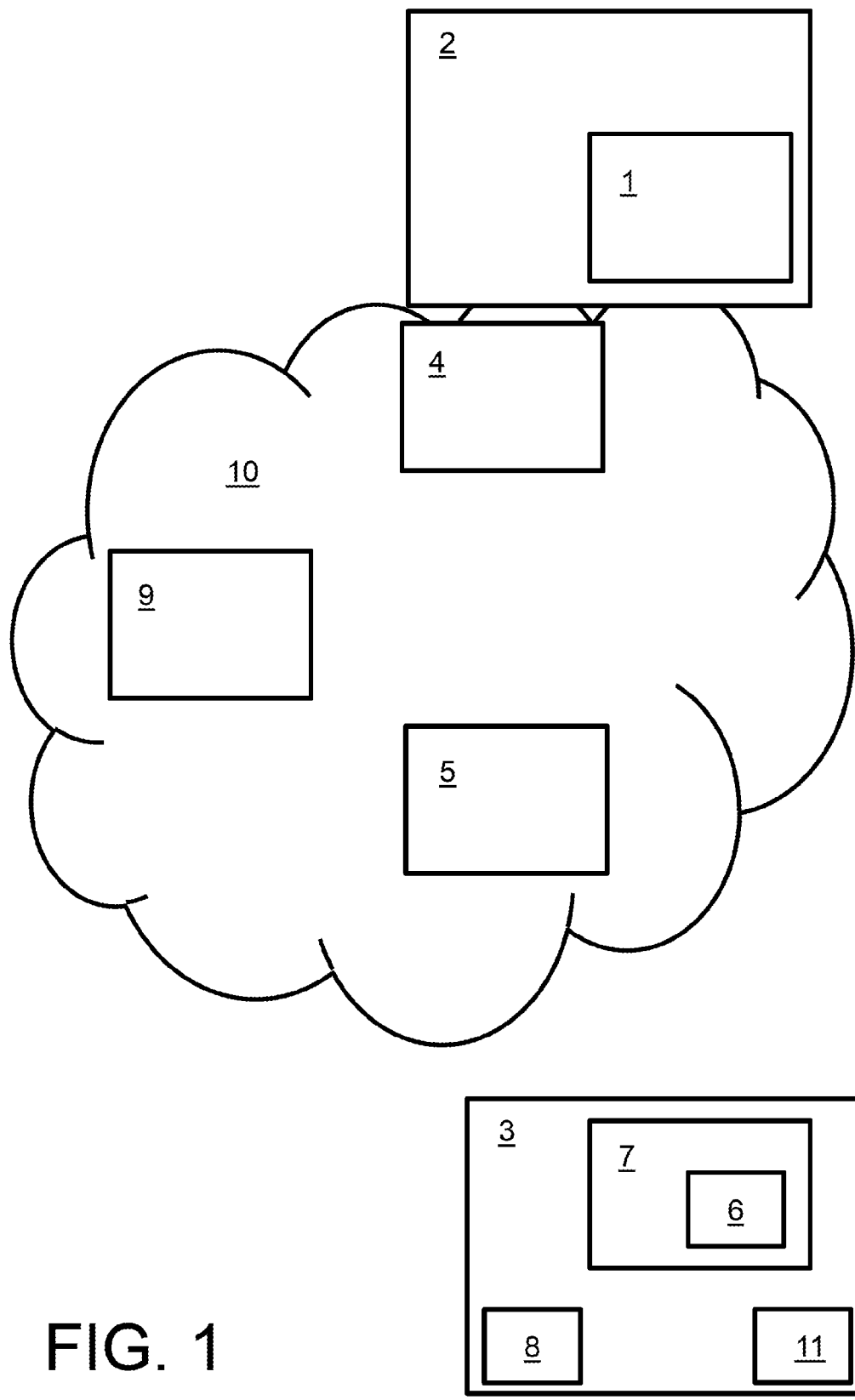
FIG. 1 is a schematic view of an arrangement for testing a control unit according to an embodiment of the invention.

FIG. 1 shows an arrangement for testing a control unit 1 via a test environment 2, wherein the test environment 2 is implemented as a hardware-in-the-loop test environment. For the purpose of initiating execution of a test plan 3 on the test environment 2, a computer-based test execution control tool 4 is provided, which is connected electrically to the test environment 2, for example by interface cards.

Located spatially distant from the test execution control tool 4, on an independent computer system, is a computer-based test management tool 5. The test management tool 5 can be implemented as the dSPACE SYNECT software, for example, and permits model-based development and/or management of the test plan 3 that is implemented as a data structure for testing the control unit 1. The control unit 1 here is the control unit 1 of a motor vehicle, an aircraft, or a robot, for example. The test plan 3 includes at least one test sequence 7 having a test 6, and a start condition 8 for initiating execution of the test plan 3. A function of the control unit 1 can be tested by each test 6 of the test sequence 7.

The arrangement also has a computer-based database 9 that stands in operative connection with both the test management tool 5 and the test execution control tool 4. In this design, the database 9 is configured to store the test plan 3 that is implemented as a data structure, wherein the test execution control tool 4 and the test management tool 5 both have shared and simultaneous access to the test plan 3. The connection between the database 9, the test execution control tool 4, and the test management tool 5 is implemented through a network 10.

Figure 2:
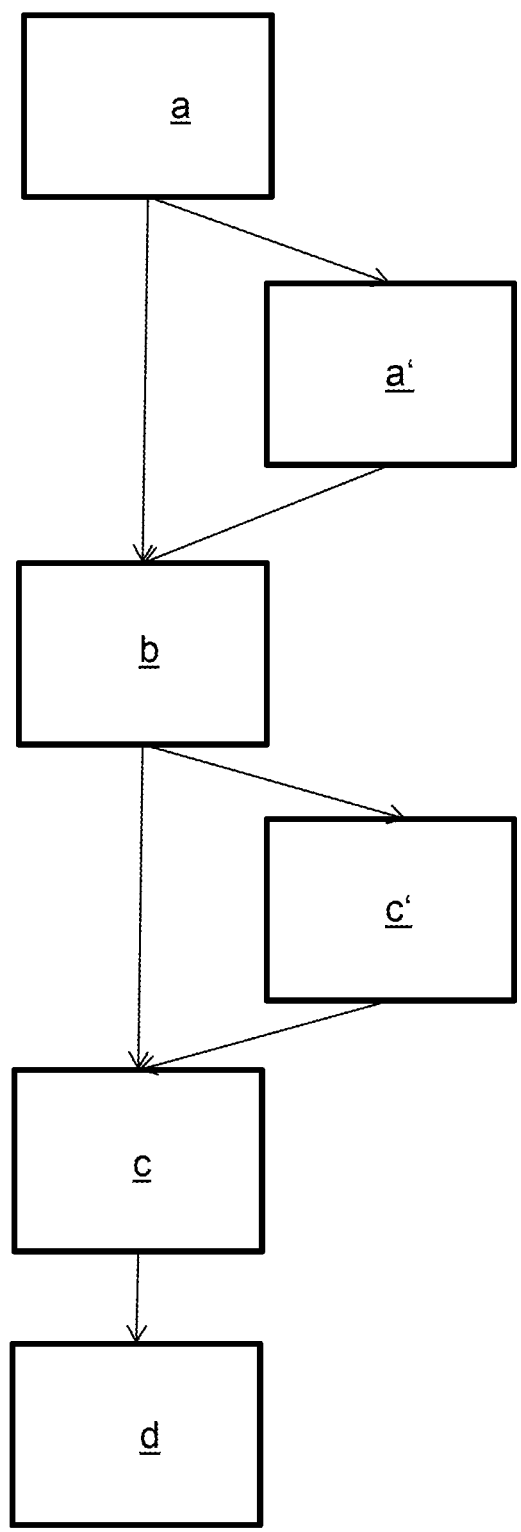
FIG. 2 is a flowchart of a method for testing the control unit according to the invention.

Now, for the purpose of testing the control unit 1, first a test plan 3 is developed on the test management tool 5 in accordance with the step a) shown in FIG. 2, and is stored in the database 9 in accordance with step b). The test plan 3 also includes a variant configuration 11, such as, for example, information as to whether the control unit 1 is designed for a gasoline engine or a diesel engine. In accordance with step a') the test management tool 5 additionally checks whether the variants of the variant configuration 11 are consistent with the test plan 3, or in other words whether the test plan 3 can be used at all for testing the control unit 1.

In step c), the test execution control tool 4 first checks whether the start condition 8 is met, which is to say whether execution of the test plan 3 on the test environment 2 can be started. The start condition 8 can be configured as a time of day, as a priority, or as availability of the test environment 2, for example. Thus, for example, if a previous test plan 3 has been processed to completion on the test environment 2 and the test environment 2 is hence free, the test environment 2 can then be configured in accordance with the variant configuration 11 by means of step c'). Once appropriate configuration has taken place, the test execution control tool 4 can then execute the test plan 3 on the test environment 2.

In the test management tool 5, the test plans 3 are administered and are assigned attributes so that, for example, the applicability of the test plans 3 can be described, which is to say whether a certain test sequence 7 or test 6 can only be used for a defined set or combinations of variant configurations 11. In this way, it is possible to ensure that test plans 3 that are not at all intended for execution on the test environment 2, and could possibly result in a failure of the test environment 2, are not executed on the test environment 2. Furthermore, a user has the opportunity to assemble test plans 3 for chronological execution, and to plan the execution based on the start condition 8. Moreover, it is possible to define the configuration of the test environment 2 by defining the variant configuration 11.

While the test management tool 5 is installed in a user's office, for example, the test execution control tool 4, which is installed a specific 50 m distant, has access to the test plans 3 stored in the database 9, thus namely to the test sequences 7 with the tests 6 and the start condition 8 on the one hand, and to the test environment 2 and the associated control unit 1 on the other hand.

Now if, by way of example, a user wishes to first carry out test plans 3 overnight for a model line for the German market and then subsequently execute test cases for the American market, the user can first create two test plans 3 on the test management tool 5. The test management tool 5 ensures, as early as during creation of the test plans 3, that only executable test plans 3 can be selected. After scheduling execution of the test plans 3 by appropriately defining the start conditions 8 in terms of time, automatic execution of the test plans 3 is carried out by means of the test execution control tool 4.

Thus, the user can define that the first test plan 3 should start at 6:00 PM, for example, while the second test plan 3 should be executed after completion of the first test plan 3. The test environment 2 is configured by the test execution control tool 4 by means of annotation of the variant configuration 11 of the test plans 3, thus, e.g., as Germany and America.

During execution of the test plan 3 on the test environment 2, the test execution control tool 4 monitors the test progress and, in accordance with step d) shown in FIG. 2, plays the test data acquired by the test environment 2 from the control unit 1 tested using the test plan 3 back to the database 9. The test management tool 5 then in turn has access to the test data thus acquired, which can then be analyzed graphically, for example. Moreover, the possibility also exists for the arrangement to have a plurality of test execution control tools 4 that are each connected to separate test environments 2 so that a plurality of test plans 3 can be executed in parallel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system arrangement for testing a control unit via a test environment, the arrangement comprising:
   a test management device configured for model-based development and management of at least one test plan implemented as a data structure in order to test the control unit, each test plan having at least one test and a start condition for initiating execution of the test plan;
   a test execution control device operating the test environment, wherein the test execution control device initiates execution of the at least one test plan on the test environment if the start condition is met; and
   a database device configured to store the data structure of the at least one test plan and connected, for shared, common, simultaneous, real-time access to the test plan, to the test management device and the test execution control device,
   wherein the test management device, the test execution control device, and the database device are separate and connected to each other,
   wherein the test management device and the test execution control device each have direct access to the database device, the test management device providing the test plan to the database device based on the control unit under test.

2. The system arrangement according to claim 1, wherein the test execution control device and the test management device are located on separate and independent computers that are spatially distant from one another.

3. The system arrangement according to claim 1, wherein the test execution control device and the test management device are located on computers that are separated from one another by at least 5m, 10m, 20m, 50m or 100m distance.

4. The system arrangement according to claim 1, wherein the start condition comprises a time of day, a priority, an availability of the test environment, and/or a completion of a different test plan.

5. The system arrangement according to claim 1, wherein the test execution control device provides test data acquired by the test environment from the control unit tested using the test plan back to the database.

6. The system arrangement according to claim 1, having a plurality of test execution control device, wherein each of the test execution control devices is configured to initiate execution of a particular test plan on a test environment associated with the particular test execution control device.

7. The system arrangement according to claim 6, wherein the test environment is implemented as a model-in-the-loop, software-in-the-loop, processor-in-the-loop, or hardware-in-the-loop environment.

8. The system arrangement according to claim 7, wherein the test plan comprises a variant configuration, and wherein the test management device is designed for consistency testing of the variants with respect to the test plan, or wherein the test execution control device configures the test environment in accordance with the variant configuration prior to execution of the test plan.

9. The system arrangement according to claim 1, wherein the test environment is configured to initiate execution of the test plan, and the test execution control device is located on the test environment.

10. The system arrangement according to claim 1, wherein the test management device develops each test plan for at least one variant configuration of the control unit.

11. The system arrangement according to claim 1, wherein the database device and the test management device are separate and distinct devices, and wherein the database device and the test execution control device are separate and distinct devices.

12. The system arrangement according to claim 1, comprising: at least two test plans, wherein one of the at least two test plans is developed in parallel with the test execution control device implementing another of the at least two test plans.

13. The system arrangement according to claim 1, wherein the test execution control device does not terminate the test plan being implemented, if an error occurs at the control unit under test.

14. The system arrangement according to claim 1, wherein updates to the at least one test plan executed at the test execution control device are performed at the database device, and wherein the updates to unexecuted steps are performed during execution.

15. The system arrangement according to claim 14, wherein the test execution control device and the test management device access the at least one test plan on the database device at the same time.

16. A method for testing a control unit via a test environment, the method comprising:
   developing a test plan implemented as a data structure for testing the control unit on a test management device as part of a model-based development of control units, the test plan having at least one test and a start condition for initiating execution of the test plan;
   storing the test plan in a computer-based database device that is configured for shared, common, simultaneous, real-time access to the test plan by the test management device and a test execution control device; and
   when the start condition is met, initiating execution of the test plan on the test environment by the test execution control device,
   wherein the test management device and the test execution control device each have direct access to the database device, the test management device providing the test plan to the database device based on the control unit under test.

17. The method according to claim 16, wherein the test execution control device and the test management device are located on separate and independent computers that are spatially distant from one another.

18. The method according to claim 16, further comprising:
   providing back to the database device, test data acquired by the test environment from the control unit tested using the test plan, wherein the test plan is updated on the database device by the test management device in response to the test data.

19. The method according to claim 16, wherein the test plan comprises a variant configuration, and further comprising the steps:
   testing a consistency of variants with respect to the test plan by the test management device; or
   configuring the test environment in accordance with the variant configuration prior to execution of the test plan by the test execution control device.

* * * * *